United States Patent
Kondo et al.

(10) Patent No.: US 9,897,746 B2
(45) Date of Patent: Feb. 20, 2018

(54) LIQUID CRYSTAL DISPLAY DEVICE

(71) Applicant: Mitsubishi Electric Corporation, Tokyo (JP)

(72) Inventors: Taiji Kondo, Tokyo (JP); Hiroshi Nagatomo, Tokyo (JP); Hideyuki Murai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/741,676

(22) Filed: Jun. 17, 2015

(65) Prior Publication Data
US 2016/0103276 A1    Apr. 14, 2016

(30) Foreign Application Priority Data

Oct. 9, 2014 (JP) .................................. 2014-207837

(51) Int. Cl.
*G02F 1/1335* (2006.01)
*G02F 1/1333* (2006.01)
*F21V 8/00* (2006.01)

(52) U.S. Cl.
CPC ........... *G02B 6/0085* (2013.01); *G02B 6/003* (2013.01); *G02B 6/009* (2013.01); *G02B 6/0068* (2013.01); *G02B 6/0083* (2013.01); *G02F 1/133308* (2013.01); *G02F 1/133615* (2013.01); *G02F 2001/133628* (2013.01)

(58) Field of Classification Search
CPC ................. G02B 6/0085; G02F 1/1336; G02F 1/133615; H01S 5/02288
See application file for complete search history.

(56) References Cited

U.S. PATENT DOCUMENTS

| | | | | |
|---|---|---|---|---|
| 5,296,724 A * | 3/1994 | Ogata | .................. | G02B 6/4204 257/680 |
| 2009/0096957 A1* | 4/2009 | Hiyama | ................. | G02B 6/003 349/65 |
| 2010/0053495 A1* | 3/2010 | Cadio | .................. | G02B 6/0035 349/61 |
| 2010/0182789 A1* | 7/2010 | Tsai | ........................ | F21S 8/026 362/294 |
| 2011/0242804 A1* | 10/2011 | Yang | .................... | G02B 6/0068 362/231 |

(Continued)

FOREIGN PATENT DOCUMENTS

| JP | 2009-099316 A | 5/2009 |
|---|---|---|
| JP | 2011-076781 A | 4/2011 |

*Primary Examiner* — Nathanael R Briggs
*Assistant Examiner* — Alexander Gross
(74) *Attorney, Agent, or Firm* — Birch, Stewart, Kolasch & Birch, LLP

(57) ABSTRACT

The present invention includes a liquid crystal panel, a light guide member, at least one laser diode (LD), and a heat sink. The light guide member is arranged on a back surface of the liquid crystal panel. The LD is arranged on at least one side surface of the light guide member. The heat sink is arranged to extend along a back surface of the light guide member and the side surface of the light guide member integrally and at least partially. The heat sink is arranged such that a part of the heat sink corresponding to the side surface of the light guide member houses at least a light-emitting surface of the LD.

9 Claims, 12 Drawing Sheets

(56) References Cited

U.S. PATENT DOCUMENTS

2014/0376261 A1* 12/2014 Liu .................. G02B 6/0031
362/609
2015/0022759 A1* 1/2015 Huey .................. G21H 3/02
349/65

* cited by examiner

F I G. 4
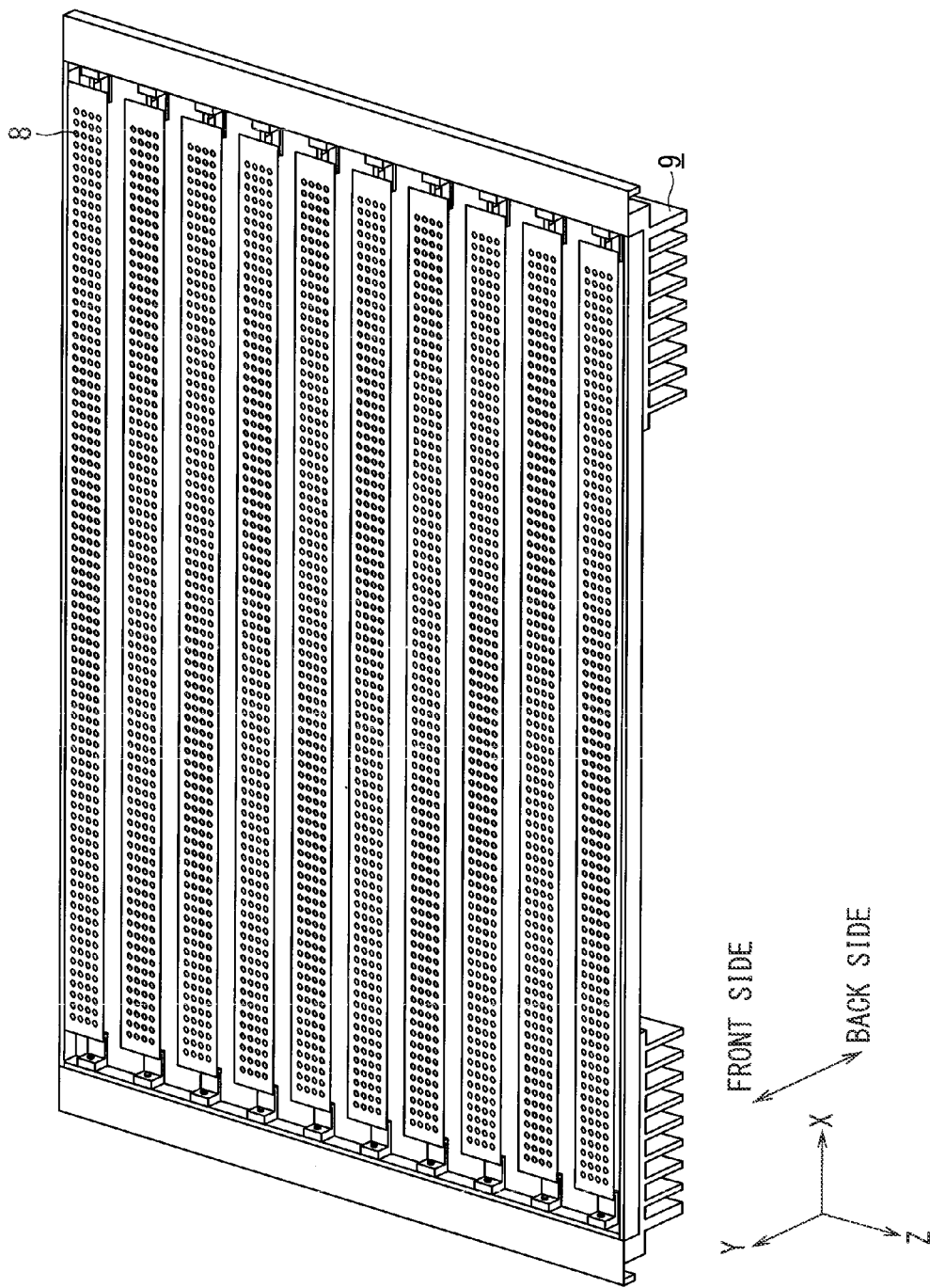

LIQUID CRYSTAL DISPLAY DEVICE

FIELD OF THE INVENTION

The present invention relates to a liquid crystal display device, particularly to a heat dissipating structure for a light-emitting element forming a light source.

BACKGROUND ART

A liquid crystal display element in a liquid crystal display device does not emit light itself. Thus, the liquid crystal display device includes a backlight unit arranged on the back surface of the liquid crystal display element functioning as a light source to illuminate the liquid crystal display element. In response to dramatic improvement of the performance of a blue light-emitting diode (blue LED) in recent years, a backlight unit using a blue LED as a light source has been in widespread use.

A light source using a blue LED includes as its components a blue LED to emit blue light and a phosphor to absorb light emitted from the blue LED and emit light of a color to become a complementary to blue (color including green and red or yellow). Such a light source is called a white LED.

A white LED converts electricity to light efficiently, so that it contributes effectively to lower power consumption. Meanwhile, the white LED has a problem of a narrow color reproduction range resulting from its wide wavelength bandwidth.

A liquid crystal display device includes a color filter inside a liquid crystal display element of this liquid crystal display device. Only a spectral range of red, green, and blue is taken out with the color filter for color reproduction. If a light source to be used has a continuous spectrum of a wide wavelength bandwidth such as the white LED, the purity of a color to be displayed through the color filter should be increased to expand a color reproduction range. Specifically, a wavelength band to pass through the color filter is set to be narrow. However, setting the wavelength band to pass through the color filter narrow in turns reduces light use efficiency. This is for the reason that setting the narrow wavelength band increases the amount of unnecessary light not to be used for image display by the liquid crystal display element. This reduces the brightness of a display surface on the liquid crystal display element, leading to a problem of increase in power consumption by the liquid crystal display device.

Using a semiconductor laser (or laser diode (LD)) as a backlight unit has been suggested as means to solve the aforementioned problems. The LD features a narrow wavelength bandwidth and excellent monochromaticity. By using the LD light source as a backlight, the color reproduction range of a liquid crystal display device can be expanded.

In a conventional system (direct-lit system) of placing a light source directly below a liquid crystal display device and irradiating the liquid crystal display device with light from directly below, using an LD as the light source enhances color reproducibility (color gamut) resulting from the high monochromaticity of the LD. However, compared to using an LED as the light source, using the LD results in a small angle of divergence of light to narrow a light-emitting region. Using the LD also causes a problem of nonuniform brightness that may be caused easily on a display surface.

The number of LDs to be used should be increased in order to solve the aforementioned problems caused by using an LD as a light source. However, this in turn results in a problem of increase in manufacturing cost and power consumption. An LD generates larger amount of heat than an LED. Additionally, an electric connection for driving the LD should be provided between the LD and a heat transferring member. These result in a problem of difficulty in thinning a heat sink for heat dissipation (see Japanese Patent Application Laid-Open No. 2011-76781, for example).

To compensate for the weakness of using a laser light source as a backlight occurring in the direct-lit system, the following system has been developed. According to this system, a light source is placed not directly below a liquid crystal display device but on a side surface (edge) of the liquid crystal display device and light is caused to shine on an entire display surface through a light guide plate to diffuse light. This system is called an edge-lit system (see Japanese Patent Application Laid-Open No. 2009-99316, for example).

The edge-lit system has an advantage in that it can reduce manufacturing cost and power consumption by reducing the number of light sources. Meanwhile, optical output from an LD changes largely as a result of the temperature characteristics of the LD. Thus, heat generated by the LD has not been dissipated sufficiently by a system of transferring this heat to a heat sink through a wiring substrate of the LD.

In the edge-lit system using an LD as a light source, the light source is arranged on a side surface of a panel. This allows thinning of a liquid crystal display device. However, large change in the optical output from the LD as a result of the temperature characteristics of the LD causes a problem that necessitates a highly-efficient heat sink.

SUMMARY OF THE INVENTION

This technique is intended to provide a liquid crystal display device including a highly-efficient heat sink.

According to one aspect of this technique, a liquid crystal display device includes: a liquid crystal panel; a light guide member arranged on a back surface of the liquid crystal panel; at least one laser diode arranged on at least one side surface of the light guide member; and a heat sink arranged to extend along a back surface of the light guide member and the side surface of the light guide member integrally and at least partially. The heat sink is arranged such that a part of the heat sink corresponding to the side surface of the light guide member houses at least a light-emitting surface of the laser diode.

According to the aforementioned aspect of this technique, the heat sink arranged so as to cover the back surface and the side surface of the light guide member integrally has a part corresponding to the side surface of the light guide member and housing the light-emitting surface of the laser diode. This allows heat generated by the laser diode to propagate to the heat sink directly and efficiently. This achieves a liquid crystal display device with a highly-efficient heat sink.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 4 and 5 each show the internal structure of the liquid crystal display device according to the preferred embodiment;

EMBODIMENT FOR CARRYING OUT THE INVENTION

Figure 1:
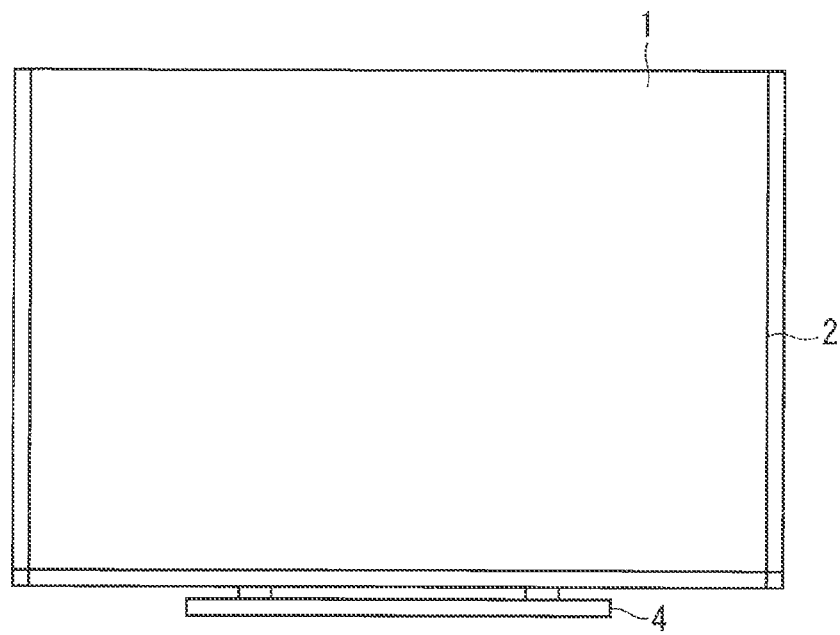
FIG. 1 is a front view of a liquid crystal display device according to a preferred embodiment.

Preferred embodiments are described below by referring to the accompanying drawings. The drawings are schematic illustrations. The sizes of images and positions of components relative to each other in different drawings do not always show precise sizes and precise positions but they can be changed appropriately. In the following description, corresponding components shown in the drawings are identified by the same sign. These components are given the same name and are assumed to have the same function. Thus, in some cases, these components will not be described in detail.

The following description contains terms indicating a particular position or a particular direction such as "above," "below," "side," "bottom," "front," and "back." These terms are used for the sake of convenience to facilitate understanding of the preferred embodiments and do not relate to directions determined when the preferred embodiments are actually implemented.

First Preferred Embodiment

<Structure>

Figure 2:
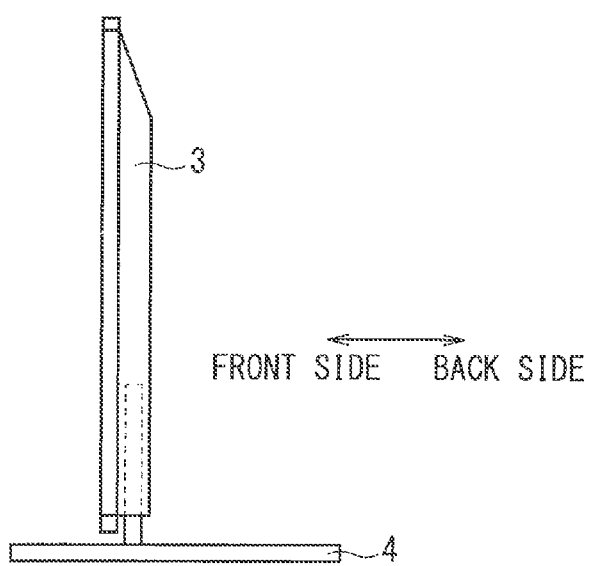
FIG. 2 is a side view of the liquid crystal display device according to the preferred embodiment.

FIG. 1 is a front view of a liquid crystal display device according to a first preferred embodiment. FIG. 2 is a side view of the liquid crystal display device according to the first preferred embodiment.

As shown in FIGS. 1 and 2, the liquid crystal display device has a liquid crystal panel 1 arranged on the front side of a casing including a front cover 2, a back cover 3, and a stand 4. The liquid crystal display device has the function of displaying images on the liquid crystal panel 1.

The front cover 2 is a front cover of the liquid crystal display device. The front cover 2 is for example made of resin and arranged on the front side of the liquid crystal panel 1.

The back cover 3 is a cover that protects the back surface of the liquid crystal display device. The back cover 3 is for example made of resin. The back cover 3 may be provided with a breathing port for heat dissipation of the liquid crystal display device.

Figure 3:
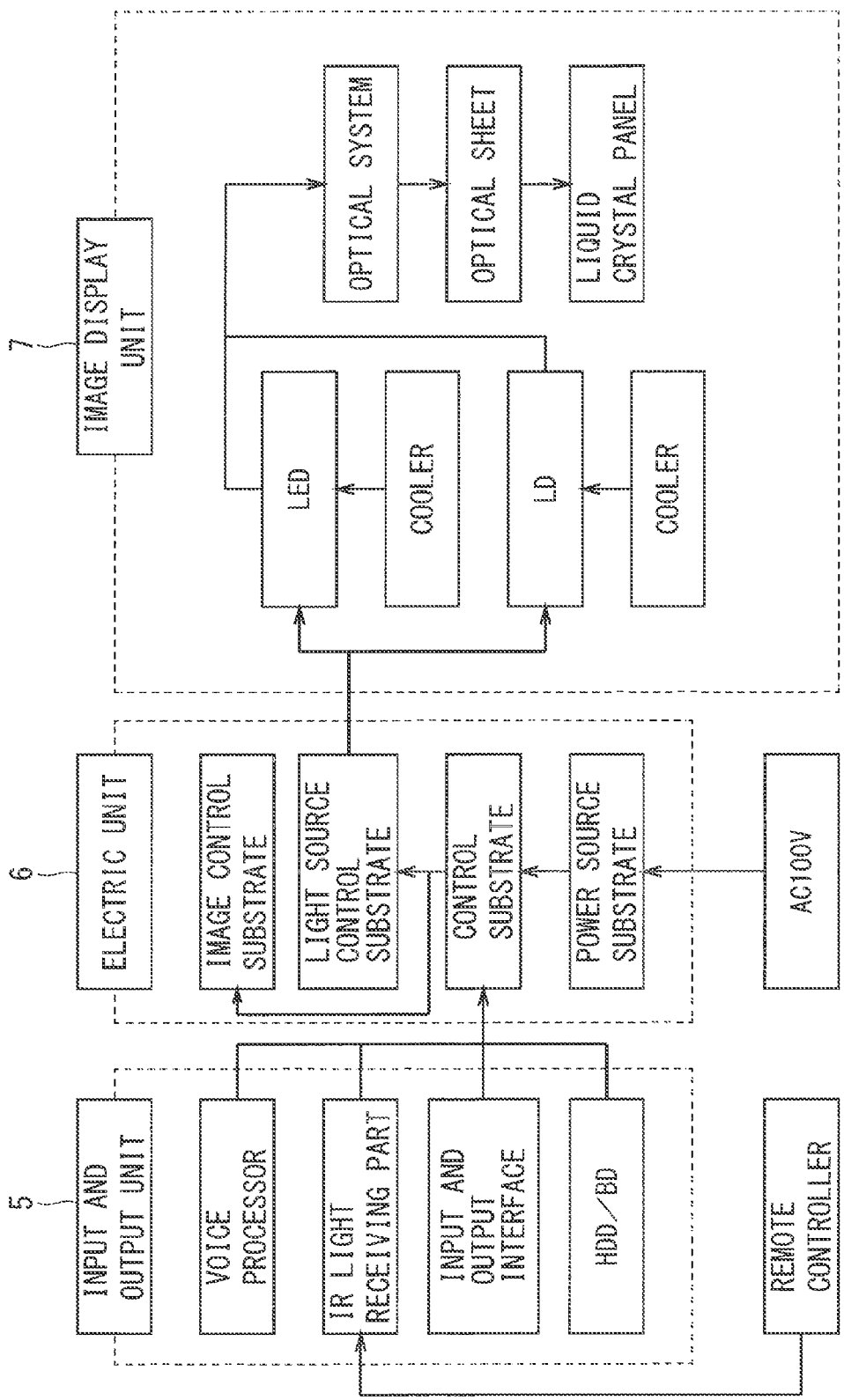
FIG. 3 is a functional block diagram of the liquid crystal display device according to the preferred embodiment.

FIG. 3 is a functional block diagram of the liquid crystal display device according to the first preferred embodiment. As shown in FIG. 3, the liquid crystal display device according to the first preferred embodiment includes an input and output unit 5 to receive an input signal for example from a remote controller, an electric unit 6 to receive an output signal from the input and output unit 5 while receiving power from a power source, and an image display unit 7 to reflect a signal from the electric unit 6 in a display on the image display unit 7. More specifically, the functions of these functional units are achieved for example by an electric circuit mounted on the liquid crystal panel of FIG. 1.

The input and output unit 5 includes a voice processor responsible for voice processing, an IR light receiving part to receive an infrared ray, an input and output interface, and a part where a hard disk drive (HDD) or Blu-ray Disc (BD) (registered trademark) is incorporated.

The electric unit 6 includes an image control substrate for control of an image, a light source control substrate for control for example of an output of a light source, a control substrate to output a control signal to the image control substrate and the light source control substrate, and a power source substrate to receive power fed from the power source.

The image display unit 7 includes an LED, a cooler to cool the LED, an LD, a cooler to cool the LD, an optical system, an optical sheet, and a liquid crystal panel.

As a specific operation, in the case of a television, for example, a signal input to the input and output unit 5 for example with a remote controller is processed by the control substrate of the electric unit 6 in response to the input signal. Then, a backlight formed of an LED 16, an LD 19, and the optical system of the image display unit 7 illuminates the liquid crystal panel through an optical sheet 11.

Figure 5:
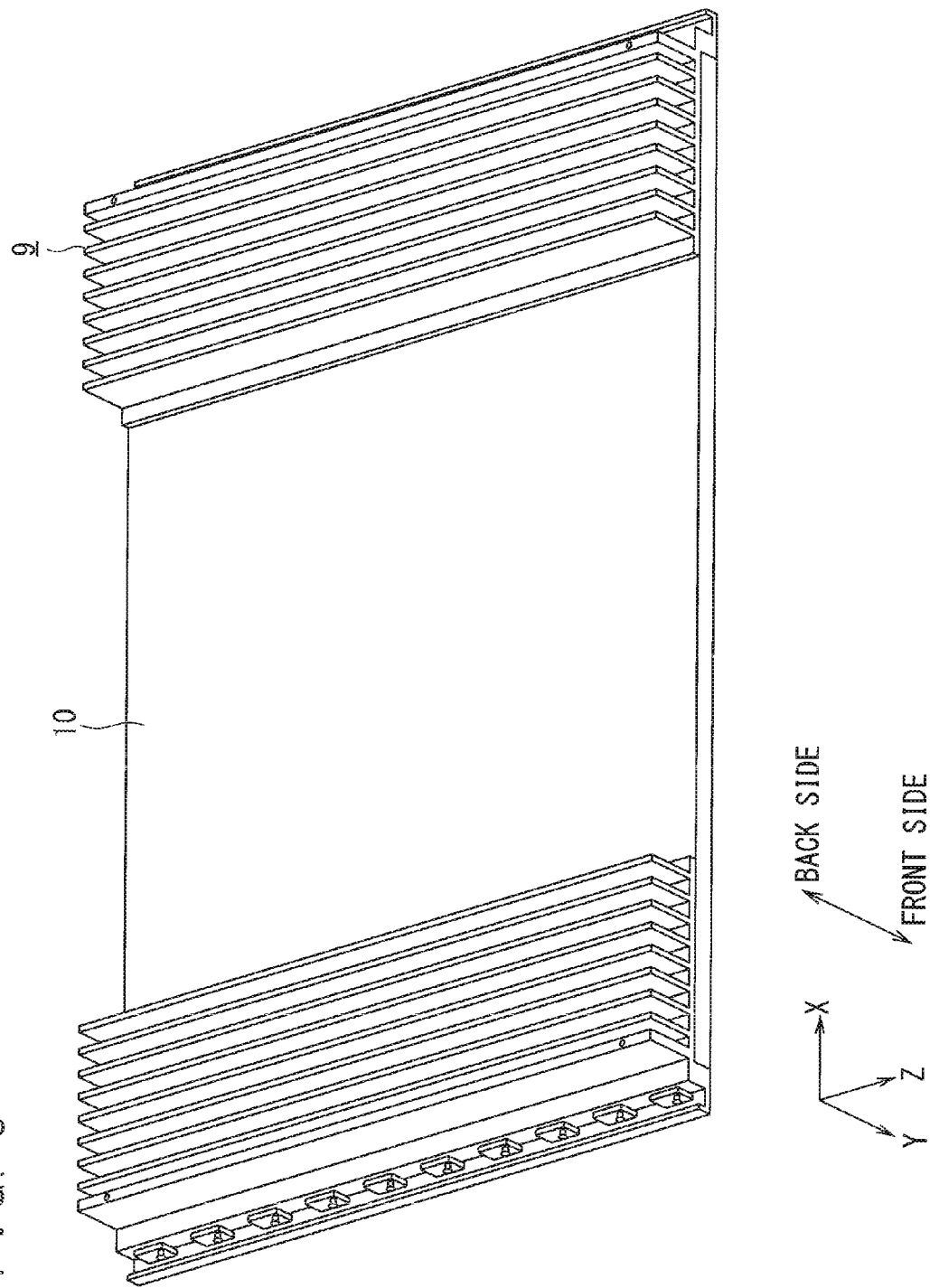
Figure 6:
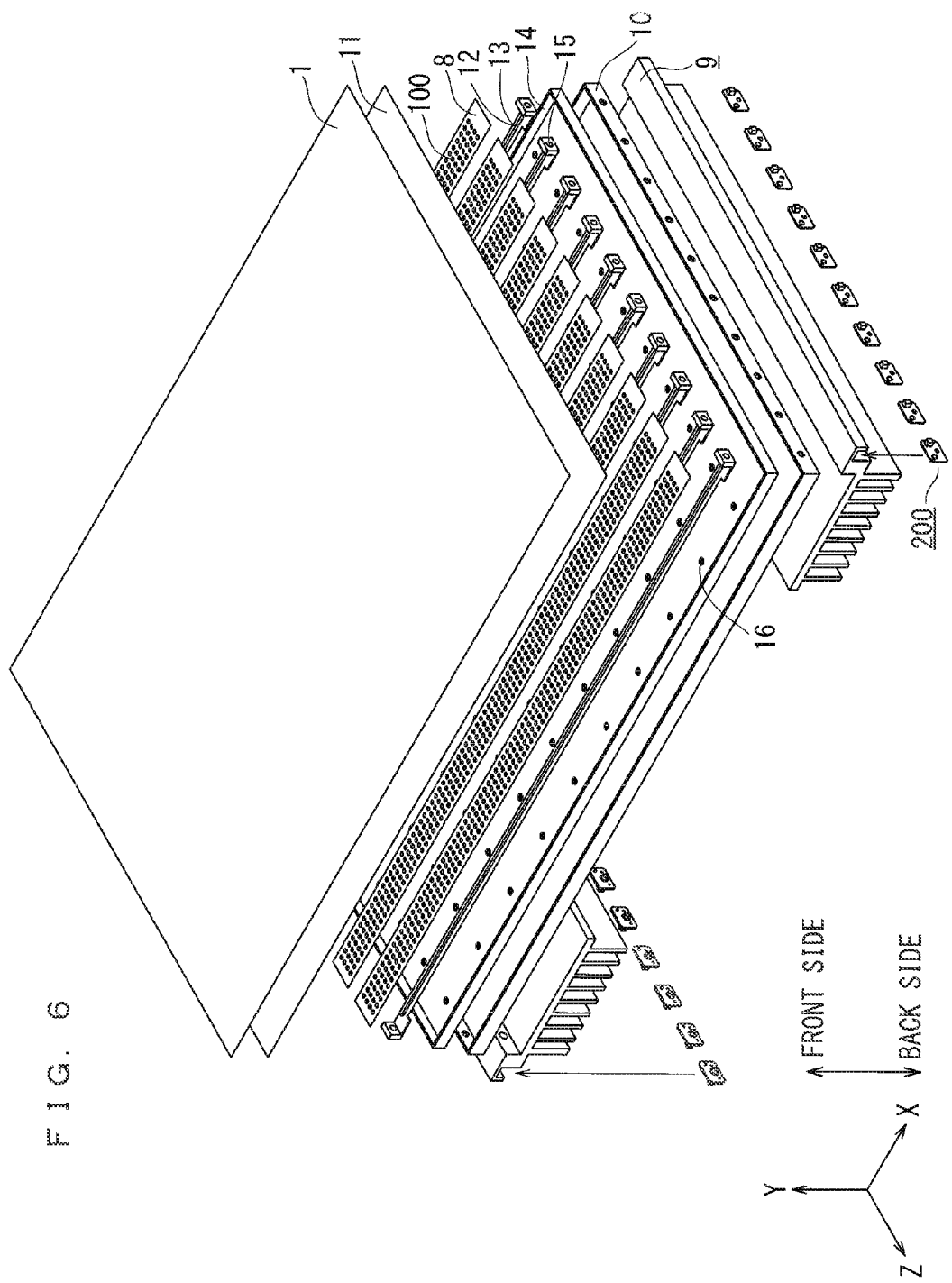
FIG. 6 is an exploded view of a structure including the internal structure shown in FIGS. 4 and 5.

FIGS. 4 and 5 each show the internal structure of the liquid crystal display device. FIG. 6 is an exploded view of a structure including the internal structure shown in FIGS. 4 and 5. In each of these drawings, a direction where an LD emits light is called an X axis, a direction parallel to a heat dissipating fin of a heat sink is called a Y axis, and a direction where LDs are arranged is called a Z axis.

As shown in FIG. 6, the liquid crystal display device according to the first preferred embodiment includes the liquid crystal panel 1, a reflection sheet 8, a heat sink 9, a back plate 10, the optical sheet 11, an LD light guide rod 12, an LED light guide rod 13, a reflection sheet 14, a rod holder 15, the LED 16, and an LD module 200.

The optical sheet 11 is arranged on the back surface of the liquid crystal panel 1 (under the liquid crystal panel 1) opposite a display surface. The reflection sheet 8 includes multiple reflection sheets 8 for example formed into strips arranged under the optical sheet 11. The LD light guide rod 12 includes multiple LD light guide rods 12 for example formed into strips arranged under corresponding ones of the reflection sheets 8. The rod holder 15 fixes the LD light guide rod 12 at opposite edge portions of the LD light guide rod 12. The LD module 200 is fixed to the rod holder 15 at at least one of the edge portions of the LD light guide rod 12. Light emitted from an LD enters through a side surface of the LD light guide rod 12 to propagate inside the LD light guide rod 12. The LED light guide rod 13 is arranged under the LD light guide rod 12. The reflection sheet 14 is arranged under the LED light guide rod 13. The back plate 10 is arranged under the reflection sheet 14. The LEDs 16 are arranged in a lattice pattern on the back plate 10. The LED 16 emits light mainly upwardly (+Y-axis direction). The LED light guide rod 13 is arranged in a place over a place where a corresponding LED 16 is arranged. Light emitted from the LED 16 enters the LED light guide rod 13. The heat sink 9 is arranged to extend along a lower side of the back plate 10 and a lateral side of the back plate 10 integrally and at least partially. The heat sink 9 is fixed to a side surface (edge portion) of the back plate 10 corresponding to an edge portion of the LD light guide rod 12 where the LD module 200 is arranged, for example.

The optical sheet 11 has the function of further enhancing the in-plane uniformity or enhancing the brightness in a front direction of light diffused through the LD light guide rod 12 and the LED light guide rod 13. The number of the optical sheets 11 is not limited to that shown in the drawings.

Except light to reach the optical sheet 11 directly, light (backlight) emitted from the LD light guide rod 12 and the LED light guide rod 13 is reflected off the reflection sheet 8 arranged on the front side of the LD light guide rod 12. The reflection sheet 8 is provided with holes 100 formed in an entire surface of the reflection sheet 8. By adjusting the shape and the distribution of the holes 100, light emitted from the LD 19 or the LED 16 can be controlled when the light passes through the liquid crystal panel 1 and is reflected off the liquid crystal panel 1. This allows this light as a surface light source to be applied to the optical sheet 11 to have brightness of a distribution that is substantially constant within the plane of the liquid crystal panel 1.

The reflection sheet 14 is arranged on an entire surface of the back plate 10. Light emitted from the LD 19 or the LED 16 not to enter the optical sheet 11 directly is reflected off the reflection sheet 14. Light emitted from the LD 19 or the LED 16 and reflected off the reflection sheet 8 is reflected off the reflection sheet 14 again. Then, the light reflected off the reflection sheet 14 and the light reflected off the reflection sheet 14 again are caused to enter the optical sheet 11. This can contribute to a uniform brightness distribution in the optical sheet 11 and enhance use efficiency of light emitted from the LD 19 and the LED 16.

The LED 16 includes a blue LED and a phosphor inside a light source. More specifically, the LED 16 includes a package provided with a blue LED chip to emit blue light and a green phosphor filling the package. The green phosphor is to absorb the emitted blue light and emit green light. This structure is devised for the following reason. A simple and compact single-color LED to emit green light or laser to emit green light that can be applied in a liquid crystal display device is inferior to a blue-green LED in terms of reducing power consumption and producing a higher output.

The LD light guide rod 12 is made of a transparent resin such as acrylic. The LD light guide rod 12 is to diffuse laser light emitted from the LD 19. Laser light entering through an edge surface of the LD light guide rod 12 propagates inside the LD light guide rod 12 while repeating reflection and scattering inside the LD light guide rod 12. The normal to the edge surface of the LD light guide rod 12 corresponding to a side surface thereof crosses the normal to the liquid crystal panel 1. Thus, laser light entering through the edge surface of the LD light guide rod 12 enters the liquid crystal panel 1 in a direction substantially parallel to the liquid crystal panel 1. Light emitted from the LD light guide rod 12 (light functioning as backlight for the liquid crystal panel 1) results from a diffusion material inside the LD light guide rod 12 and a surface condition of the LD light guide rod 12. This light has an angle significant to the axis direction of the LD light guide rod 12 during its propagation. This means that controlling the diffusion material inside the LD light guide rod 12 and the surface condition of the LD light guide rod 12 can control the brightness distribution of backlight to reach the liquid crystal panel 1. Then, laser light emitted from the LD 19 as a point light source becomes functional as a surface light source.

The LD light guide rod 12 is fixed through the rod holder 15 to the reflection sheet 14 and the back plate 10. The position of the LD light guide rod 12 is determined such that laser light emitted from the LD 19 enters the LD light guide rod 12 through its side surface.

The LED light guide rod 13 is made of a transparent resin such as acrylic. The light guide rod 13 is to diffuse light emitted from the LED 16. The LED light guide rod 13 is arranged so as to be placed over a corresponding LED 16. Light emitted from the LED 16 mainly enters the LED light guide rod 13 in a direction vertical to a side surface of the LED light guide rod 13 near the LED 16.

Figure 7:
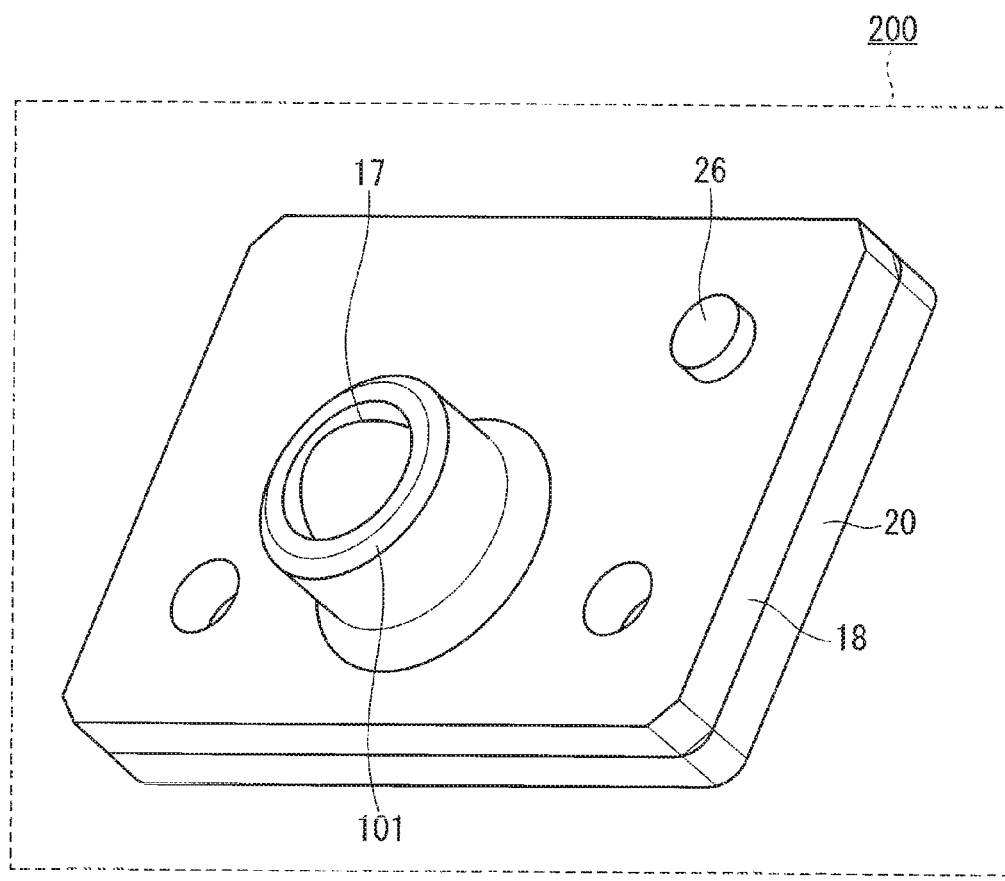
FIG. 7 is a perspective view showing the structure of an LD module according to the preferred embodiment.
Figure 8:
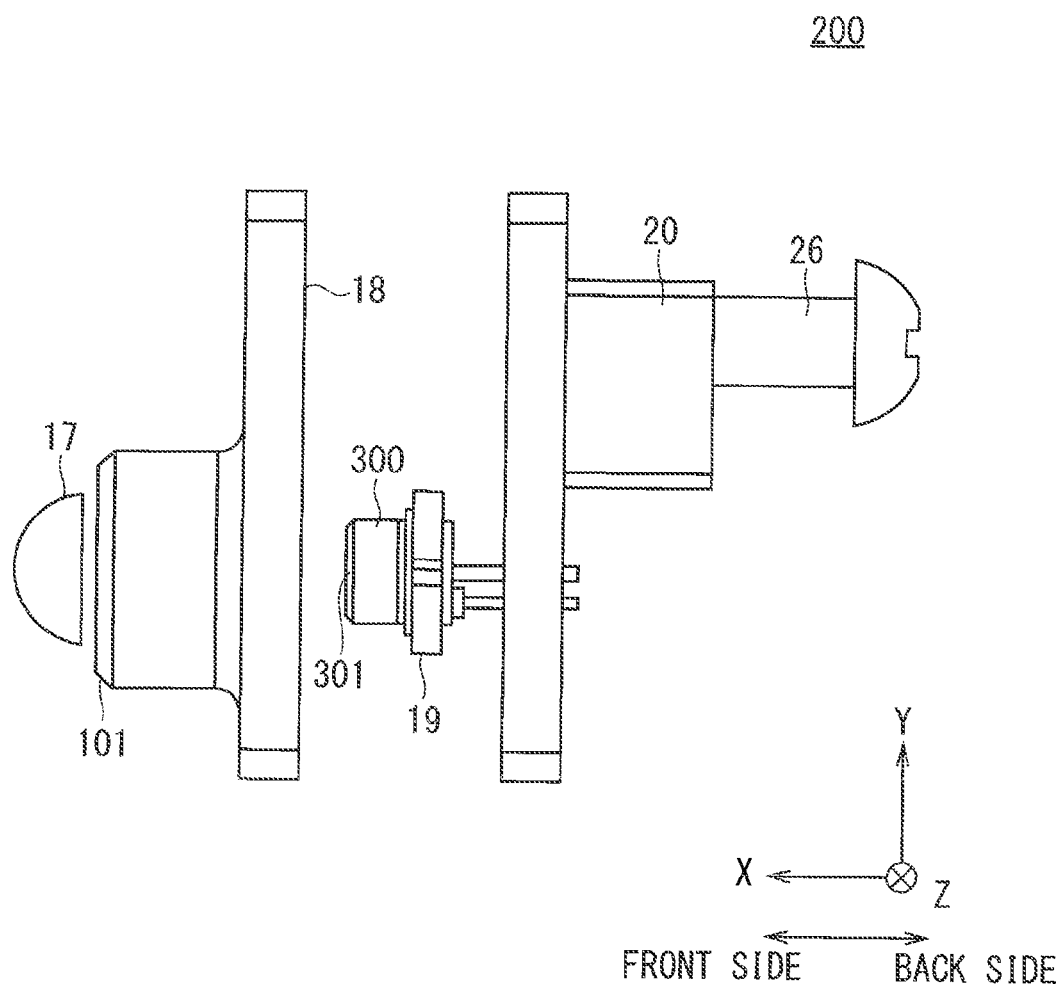
FIG. 8 is a side view showing the structure of the LD module according to the preferred embodiment.

FIG. 7 is a perspective view showing the structure of the LD module 200 that holds the LD 19. FIG. 8 is a side view showing the structure of the LD module 200. In each of these drawings, a direction where an LD emits light is called an X axis, a direction parallel to a heat dissipating fin of a heat sink is called a Y axis, and a direction where LDs are arranged is called a Z axis.

As shown in FIG. 7, the LD module 200 includes a condensing lens 17, an LD holder 18, a wiring substrate 20, and a fixing screw 26. As shown in FIG. 8, the LD holder 18 houses the LD 19. The condensing lens 17 of the LD holder 18 is arranged in an opening 101 provided on the front side of the LD holder 18. The back surface of the LD holder 18 and the wiring substrate 20 are fixed to each other with the fixing screw 26. The position of the LD 19 in the LD holder 18 is determined such that a light-emitting part 300 is housed in the opening 101 in the front side of the LD holder 18 and a light-emitting surface 301 is spaced by a given distance from the condensing lens 17. The condensing lens 17 is arranged between the light-emitting surface 301 and a side surface of the LD light guide rod 12. The normal to the light-emitting surface 301 extends toward an edge surface of the LD light guide rod 12. The LD 19 in the LD holder 18 is electrically connected to the wiring substrate 20. Light emitted from the LD 19 enters the LD light guide rod 12 through at least one side surface (edge portion) of the LD light guide rod 12.

A white LED conventionally used as a light source in a liquid crystal display device does not produce a large energy amount of a red spectrum in a wavelength bandwidth from 600 to 700 nm. Specifically, using a color filter of a narrow wavelength bandwidth with the intention of enhancing color purity in a wavelength band from 630 to 640 nm preferable for red considerably reduces an amount of light to pass through the filter, leading to reduction in light use efficiency. This causes a problem of severely reduced brightness.

Meanwhile, the LD 19 has a narrow wavelength bandwidth and achieves high color purity while suppressing brightness reduction. Using the LD 19 of considerably high monochromaticity to emit light particularly of red as one of the three primary colors works effectively for reduction in power consumption and enhancement of color purity. Thus, in the first preferred embodiment, an LD to emit red light is used as the LD 19.

Regarding the LD 19 to emit light of a wavelength band from 630 to 640 nm preferable for red, efficiency in conversion from electricity to light drops severely in response to increase in an element temperature. A preferable wavelength band for deep red is from 630 to 640 nm. If the LD 19 continues to emit light of high power in a high temperature, an element is degraded more rapidly to shorten its lifetime. In response, an efficient cooling system should be introduced.

Regarding the LED 16, change in efficiency in conversion from electricity to light relative to a temperature is considerably small compared to the LD 19. Meanwhile, heat generated by the LED 16 should be dissipated efficiently so as not to be transferred to the LD 19. In the first preferred embodiment, all the LDs 19 are arranged on a side surface of the liquid crystal panel 1 distanced from the LED 16 arranged on the back plate 10. This structure suppresses influence of heat generated by the LED 16 on the LD 19 sufficiently.

Laser light emitted from the LD 19 is high-directivity light having a certain scattering angle. To make laser light enter an incident surface of the LD light guide rod 12, the condensing lens 17 is arranged between the LD light guide rod 12 and the LD 19. The condensing lens 17 is held together with the LD 19 by the LD holder 18.

The LD 19 generally used is formed into a cylindrical package shape of a diameter of about 6 mm. The LD 19 of this package shape can be fixed by being pressed into the LD holder 18 under pressure, for example. The LD 19 is pressed into the LD holder 18 from a side opposite the light-emitting surface 301 through which laser light is to be emitted. The LD holder 18 is a member that fixes the LD 19 and the condensing lens 17. Fixing the LD 19 of the package shape to the LD holder 18 is an excellent way in terms of heat transfer efficiency. This is for the reason that heat generated by the package shape is transferred easily to the LD holder 18 through heat conduction.

The LD holder 18 is a member that fixes the LD 19 and the condensing lens 17 while being fixed to the wiring substrate 20. The LD holder 18 is made of a material of relatively high heat conductivity such as aluminum and has a complicated shape with the opening 101 and others prepared for insertion of the LD 19. Thus, it is desirable that the LD holder 18 have a compact size in order to manufacture the LD holder 18 accurately at low cost. This is for the reason that funning the LD holder 18 into a compact size enhances handling during processing to facilitate highly accurate processing of a component.

The wiring substrate 20 to drive the LD 19 is formed of a flexible substrate, for example. The wiring substrate 20 forms a pair with the LD holder 18 and is fixed to the back surface of the LD holder 18. The wiring substrate 20 is substantially the same in width, length, and thickness as the LD holder 18. The wiring substrate 20 has a hole for letting a terminal of the LD 19 pass through. The wiring substrate 20 is fixed to the LD holder 18 for example with the fixing screw 26.

The LD 19, the condensing lens 17, the LD holder 18, and the wiring substrate 20 are assembled into the integrated LD module 200. FIG. 7 shows the assembled LD module 200. Forming the LD module 200 into such a module structure brings an advantage of holding an optical system including the LD 19 and the condensing lens 17 easily.

Figure 9:
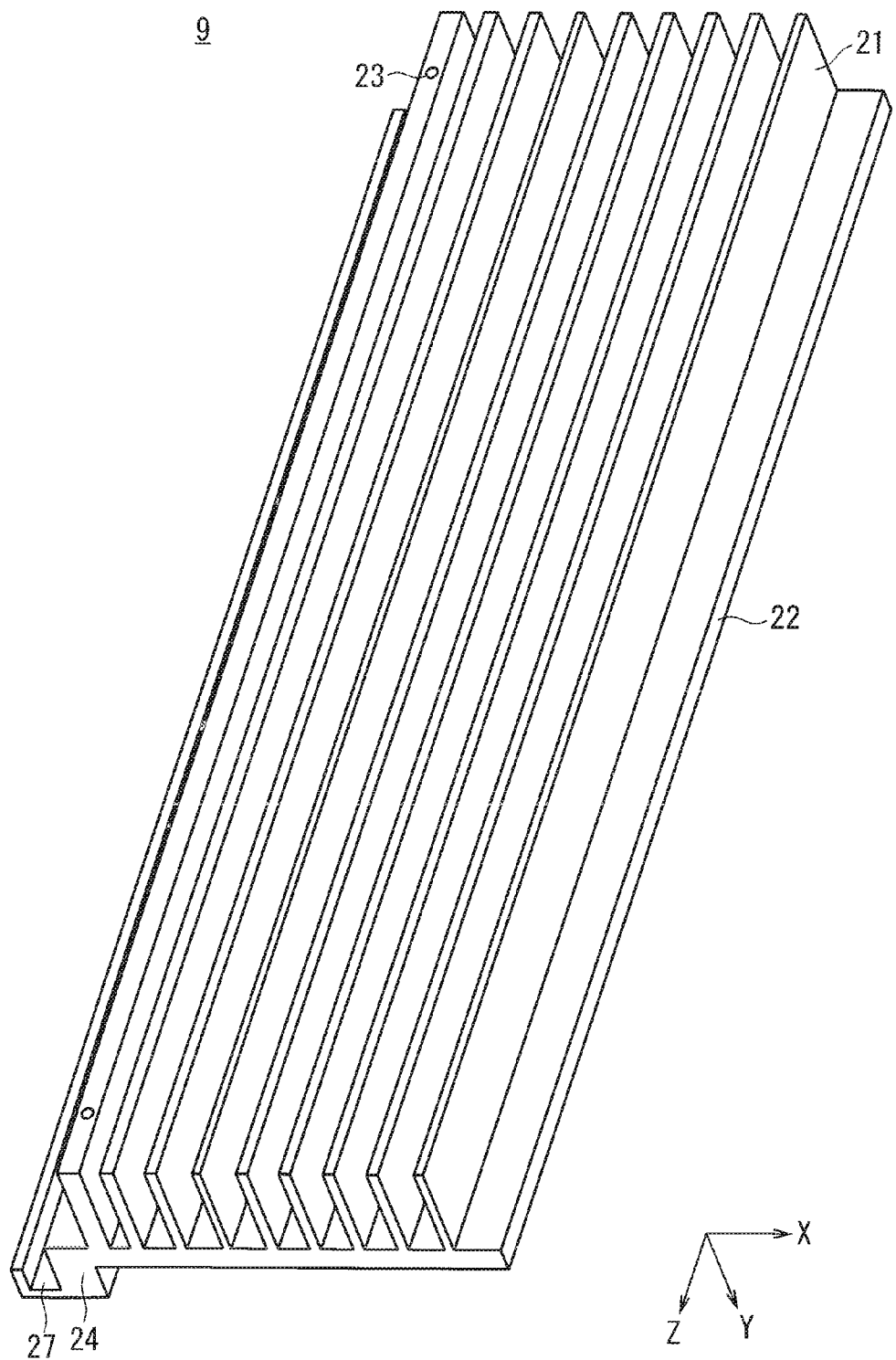
FIG. 9 is a perspective view showing the structure of a heat sink according to the preferred embodiment.
Figure 10:
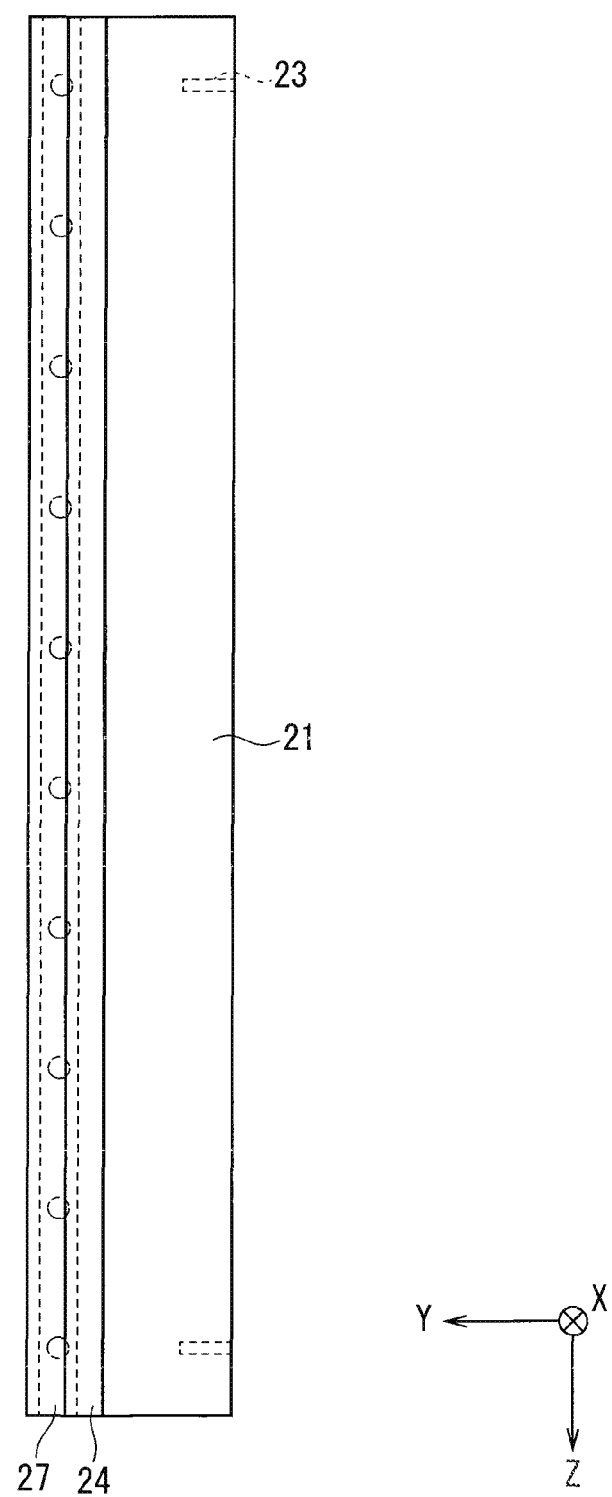
FIG. 10 is a side view showing the structure of the heat sink according to the preferred embodiment.
Figure 11:
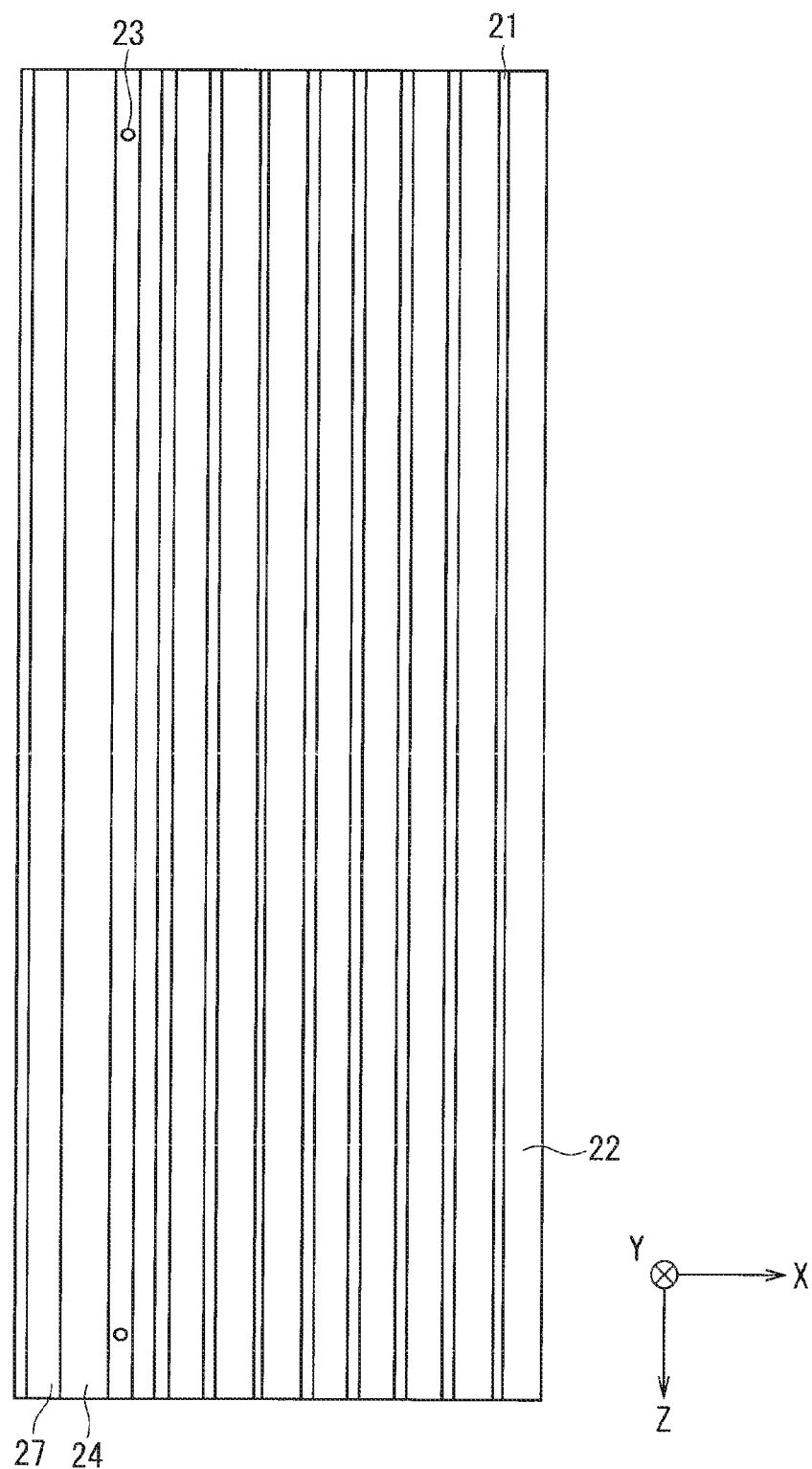
FIG. 11 is a top view showing the structure of the heat sink according to the preferred embodiment.
Figure 12:
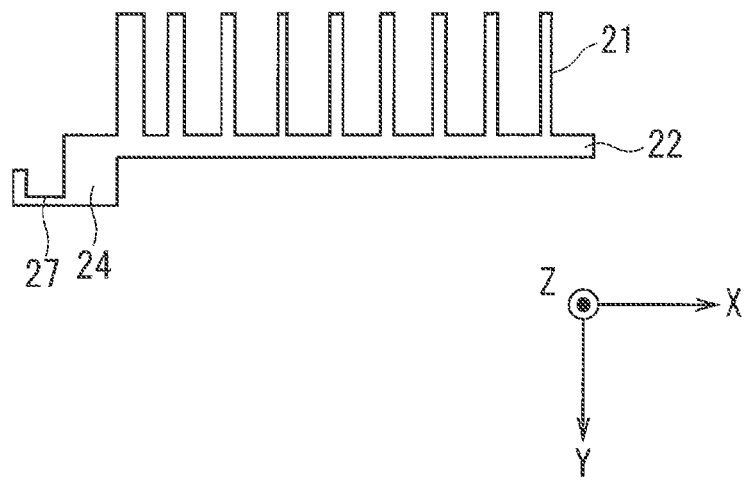
FIG. 12 is a sectional view showing the structure of the heat sink according to the preferred embodiment.

FIG. 9 is a perspective view showing the structure of the heat sink 9. FIG. 10 is a side view showing the structure of the heat sink 9. FIG. 11 is a top view showing the structure of the heat sink 9. FIG. 12 is a sectional view showing the structure of the heat sink 9. In each of these drawings, a direction where an LD emits light is called an X axis, a direction parallel to a heat dissipating fin of a heat sink is called a Y axis, and a direction where LDs are arranged is called a Z axis.

As shown in FIGS. 9 to 12, the heat sink 9 includes a base 22, heat dissipating fins 21, a projection 24, a back cover holding mechanism 23, and a wire holder 27.

The heat sink 9 is formed at relatively low cost by extruding a material with excellent heat conductivity such as aluminum. The heat sink 9 is fixed partially to the back plate 10 at least on the back surface and a side surface of the back plate 10.

The base 22 is arranged parallel to the X-Z plane and is fixed to the back surface of the back plate 10. The heat dissipating fins 21 extend downward (Y-axis positive direction) relative to the back plate 10 substantially vertically to the base 22. The projection 24 forms a part of the heat sink 9 extending along an edge portion (side surface) of the back plate 10 in the X-axis direction. The back cover holding mechanism 23 forms a part of the heat dissipating fin 21 where the back cover 3 is held with a fixing screw or the like. As an example, the back cover holding mechanism 23 is a hole for insertion of the fixing screw or the like. The wire holder 27 extends from a side of the projection 24 opposite a side of the projection 24 contacting the side surface of the back plate 10. The wire holder 27 holds a wire extending from the wiring substrate 20 and is formed into a groove shape, for example.

The projection 24 contacts the LD holder 18 and the condensing lens 17 on the side of the projection 24 (side where the wire holder 27 is formed) opposite the side thereof contacting the side surface of the back plate 10. More specifically, the projection 24 is provided with a hole 102 as a penetrating hole. The opening 101 of the LD holder 18 is housed in the hole 102. The hole 102 is formed such that light emitted from the LD 19 enters the LD light guide rod 12 through its side surface. By housing the LD holder 18 in the hole 102, the LD 19 and the condensing lens 17 are placed in their positions determined optically such that light emitted from the LD 19 enters the LD light guide rod 12. The hole 102 includes multiple holes 102 arranged in a line in the Z-axis direction. The LD module 200 includes multiple LD modules 200 arranged in a line in the Z-axis direction accordingly. Where appropriate, the arrangement and the number of the holes 102 may be changed depending on the characteristics of the LD 19 and the size of the liquid crystal panel 1.

Figure 13:
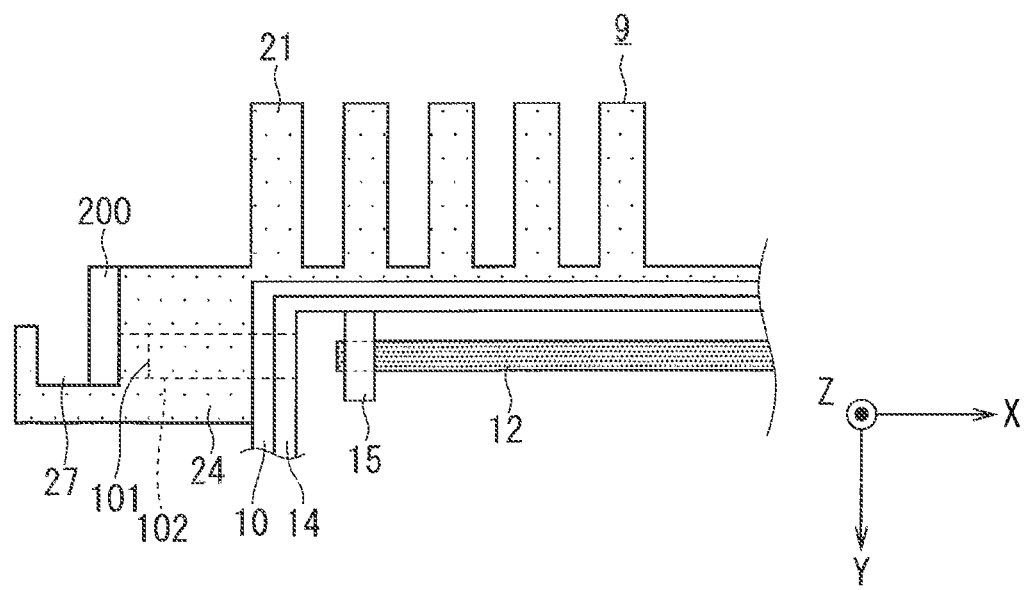
FIG. 13 is a sectional view showing the structure of the heat sink as a part of the liquid crystal display device according to the preferred embodiment.

FIG. 13 is a sectional view showing the structure of the heat sink 9 as a part of the liquid crystal display device according to the first preferred embodiment. FIG. 13 shows a condition where the LD module 200 is fixed to the heat sink 9. In FIG. 13, a direction where laser is emitted is called an X axis, a direction parallel to the heat dissipating fins 21 of the heat sink 9 is called a Y axis, and a direction where the LDs 19 as light sources are arranged is called a Z axis.

As shown in FIG. 13, the LD light guide rod 12 is fixed by the rod holder 15 to extend over the reflection sheet 14. The back plate 10 is arranged to surround the reflection sheet 14. The heat sink 9 is arranged to surround the back plate 10.

The heat sink 9 covers the back surface and the side surface of the back plate 10 integrally. The heat sink 9 is provided with the hole 102 as a penetrating hole formed in a position covering the side surface of the back plate 10. The reflection sheet 14 and the back plate 10 are also provided with respective holes formed in positions corresponding to the hole 102. This allows light emitted from the LD 19 to enter the LD light guide rod 12. Specifically, the LD 19 is arranged at least on a side corresponding to the side surface of the LD light guide rod 12. The projection 24 as a corresponding part of the side surface of the LD light guide rod 12 houses the light-emitting surface 301 of the LD 19.

A structure corresponding to the opening 101 of the LD module 200 is housed in the hole 102 formed on a side of the heat sink 9 opposite a side thereof contacting the back plate 10. The LD module 200 is fixed by being housed in the hole 102.

The wire holder 27 is arranged on the back surface of the wiring substrate 20 of the fixed LD module 200. Thus, a wire extending from the wiring substrate 20 can be held by the wire holder 27. This eliminates the need for providing space in the heat sink 9 for housing the wiring substrate 20.

Heat generated by the LD 19 is transferred to the LD holder 18. This heat is transferred further to the base 22 and the heat dissipating fins 21 through the projection 24 of the heat sink 9. Then, this heat is dissipated to air flowing between the heat sink 9 and the back cover 3. The air flowing between the heat sink 9 and the back cover 3 is caused to flow from bottom to top by natural convection (see FIG. 2).

It is desirable that the LD holder 18 be arranged such that the LD 19 contacts the inner wall surface of the LD holder 18. This arrangement allows heat generated by the LD 19 to be transferred efficiently to the heat sink 9 through the LD holder 18.

The base 22 and the heat dissipating fins 21 of the heat sink 9 of the first preferred embodiment are not arranged on the back surface of the LD 19 as a light source. This allows reduction in the width of the front cover 2 surrounding the liquid crystal panel 1.

Separating the heat sink 9 from the LD holder 18 achieves size reduction of a component. This advantageously facilitates processing of the component and handling of the component during assembly, for example.

The front side of the heat sink 9 may be alumite treated. Performing alumite treatment on the front side of the heat sink 9 achieves excellent resistance to corrosion and enhances the performance of heat dissipation from the front side.

In the aforementioned structure, the optical system including the LD 19 and the condensing lens 17 is held more accurately. Further, the LD 19 contacts the heat sink 9 through the LD holder 18. This increases a contact area between the LD 19 and the LD holder 18 to enhance heat dissipation performance.

By housing the LD module 200 in the hole 102 of the heat sink 9, the position of the optical system can be determined without requiring a fixing screw or the like.

As described above, the aforementioned liquid crystal display device according to the first preferred embodiment using the LD 19 as a light source achieves a wide color reproduction range. Further, only a simple structure is required to dissipate heat to outside generated by a light-emitting element as the light source. This achieves a thin and highly-efficient heat sink responsive to an edge type at low cost.

<Effects>

Effects of the first preferred embodiment are illustrated below.

According to the first preferred embodiment, the liquid crystal display device includes the liquid crystal panel 1, the LD light guide rod 12 as a light guide member, at least one laser diode (LID 19), and the heat sink 9.

The LD light guide rod 12 is arranged on the back surface of the liquid crystal panel 1. The LD 19 is arranged on at least one side surface of the LD light guide rod 12. The heat sink 9 is arranged to extend along a back surface of the LD light guide rod 12 and the side surface of the LD light guide rod 12 integrally and at least partially.

The heat sink 9 is arranged such that a part of the heat sink 9 corresponding to the side surface of the LD light guide rod 12 houses at least the light-emitting surface 301 of the LD 19.

In this structure, the heat sink 9 arranged to extend along the LD light guide rod 12 so as to cover the back surface and the side surface of the LD light guide rod 12 integrally houses the light-emitting surface 301 of the LD 19 in the part corresponding to the side surface of the LD light guide rod 12. This allows heat generated by the LD 19 to propagate to the heat sink 9 directly and efficiently. This achieves the liquid crystal display device with the highly-efficient heat sink 9. Heat propagates through the heat sink 9 more efficiently, so that the heat sink 9 is not required to be increased in size.

The heat sink 9 is not arranged on the back surface of the LD 19. This allows reduction of the width of the front cover 2 surrounding the liquid crystal panel 1.

A structure other than the aforementioned structures can be omitted, where appropriate. The aforementioned effects can also be achieved by appropriately adding an arbitrary structure illustrated in this specification.

According to the first preferred embodiment, the liquid crystal display device includes the LD module 200 as a holding member that holds a laser diode (LD 19).

The heat sink 9 is arranged so as to house the LD module 200 that houses the light-emitting surface 301 of the LD 19.

In this structure, the optical system including the LD 19 and the condensing lens 17 can be held easily by the LD module 200. Further, heat generated by the LD 19 is allowed to propagate to the heat sink 9 efficiently through the LD module 200.

According to the first preferred embodiment, the LD module 200 as a holding member holds the condensing lens 17 arranged between the light-emitting surface 301 and the side surface of the LD light guide rod 12 as a light guide member.

This structure facilitates positioning of the optical system including the condensing lens 17. Further, this structure does not require an additional structure for holding the condensing lens 17. Thus, a component count can be reduced.

According to the first preferred embodiment, the LD module 200 as a holding member includes the LD holder 18 as a first member that holds a laser diode (LD 19) and the wiring substrate 20 as a second member connected to the LD 19.

This structure facilitates positioning of the optical system. Further, providing the LD holder 18 and the wiring substrate 20 as a pair facilitates handling of a structure around an LD including the wiring substrate 20.

According to the first preferred embodiment, the LD module 200 as a holding member includes the wire holder 27 that holds a wire for a laser diode (LD 19) extending from the wiring substrate 20 as the second member.

This structure can make the wire holder 27 hold the wire extending from the wiring substrate 20. This eliminates the need for providing additional space in the heat sink 9 for housing the wiring substrate 20.

According to the first preferred embodiment, a laser diode (LD 19) includes multiple laser diodes arranged along at least one side surface of the LD light guide rod 12 as a light guide member.

This structure suppresses nonuniformity of the brightness of the liquid crystal panel 1, so that a uniform brightness distribution is achieved.

According to the first preferred embodiment, at least one light-emitting diode (LED 16) is arranged on the back surface of the LD light guide rod 13 as a light guide member.

This structure suppresses nonuniformity of the brightness of the liquid crystal panel 1, so that a uniform brightness distribution is achieved.

Second Preferred Embodiment

In the below, structures same as those described in the first preferred embodiment are identified by the same signs in the drawing and if appropriate, will not be described in detail.

Figure 14:
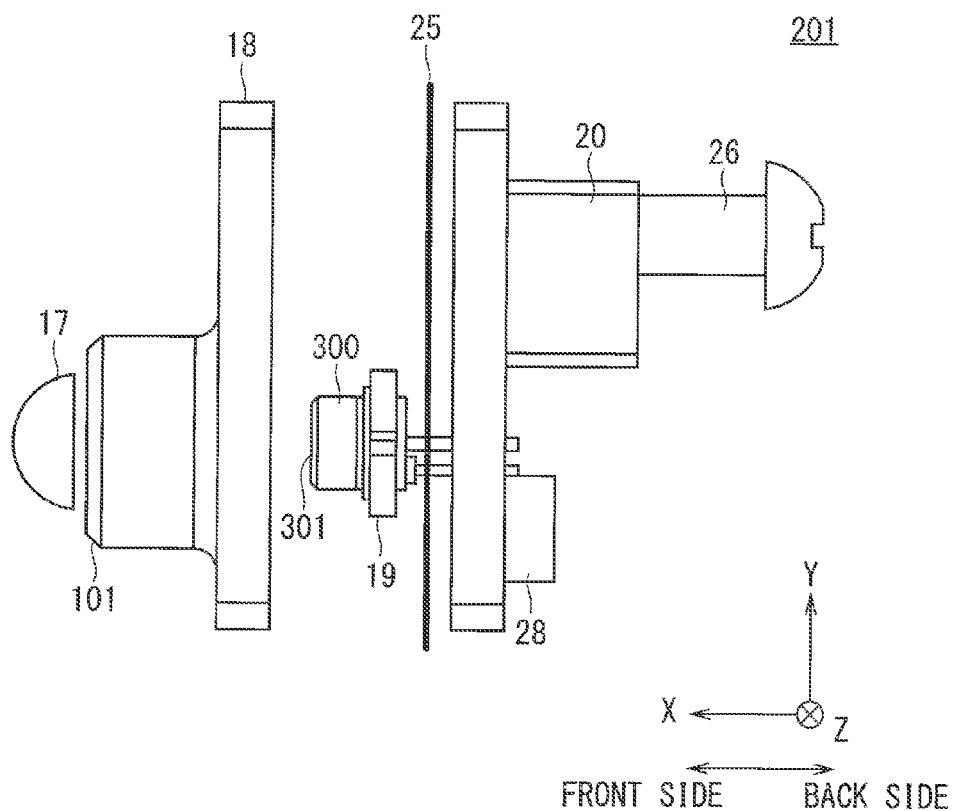
FIG. 14 is a side view showing the structure of the LD module as a part of the liquid crystal display device according to the preferred embodiment.

FIG. 14 is a side view showing the structure of an LD module 201 as a part of a liquid crystal display device according to a second preferred embodiment. In FIG. 14, a direction where laser is emitted is called an X axis, a direction parallel to the heat dissipating fins 21 of the heat sink 9 is called a Y axis, and a direction where the LDs 19 as light sources are arranged is called a Z axis.

In the second preferred embodiment, the LD holder 18 further includes a heat transferring member 25 arranged between the LD 19 and the wiring substrate 20. The heat transferring member 25 has the function of transferring heat generated by the wiring substrate 20 to the heat sink 9 through the LD holder 18.

The wiring substrate 20 has the function of controlling optical output of the LD 19. By providing a thermistor 28 on the wiring substrate 20, for example, optical output of the LD 19 can be maintained at a constant level based on temperature change of the wiring substrate 20. This makes it possible to maintain a constant brightness distribution on the liquid crystal panel 1.

This structure allows heat of the LD module 201 to propagate to the heat sink 9. Further, providing the mechanism for controlling optical output achieves a more uniform in-plane brightness of the liquid crystal panel 1.

<Effects>

Effects of the second preferred embodiment are illustrated below.

According to the second preferred embodiment, the liquid crystal display device includes the heat transferring member 25 arranged between the LD holder 18 as a first member and the wiring substrate 20 as a second member.

This structure allows heat to be transferred easily between the LD holder 18 and the wiring substrate 20. Thus, heat generated by the LD module 201 is allowed to propagate to the heat sink 9 more efficiently.

Third Preferred Embodiment

In the below, structures same as those described in the aforementioned preferred embodiments are identified by the same signs in the drawing and if appropriate, will not be described in detail.

Figure 15:
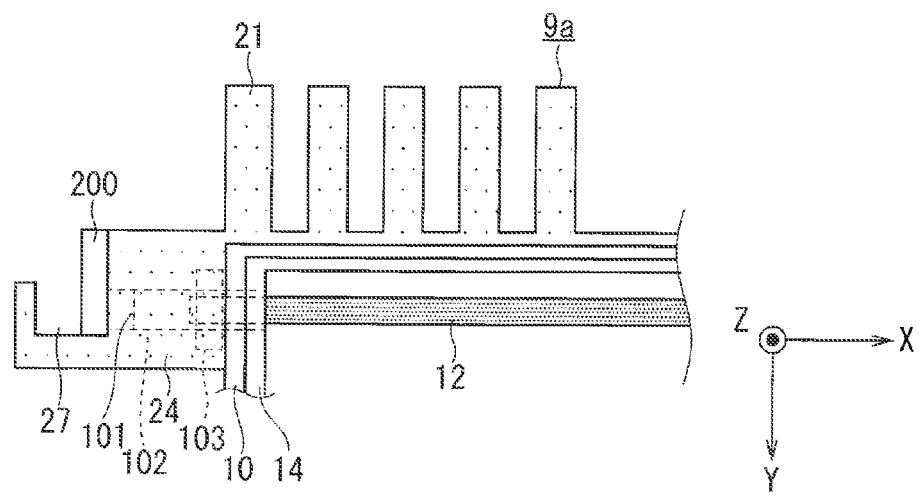
FIG. 15 is a sectional view showing the structure of the heat sink as a part of the liquid crystal display device according to the preferred embodiment.

FIG. 15 is a sectional view showing the structure of a heat sink 9a as a part of a liquid crystal display device according to a third preferred embodiment. FIG. 15 shows a condition where the LD module 200 is fixed to the heat sink 9a. In FIG. 15, a direction where laser is emitted is called an X axis, a direction parallel to the heat dissipating fins 21 of the heat sink 9a is called a Y axis, and a direction where the LDs 19 as light sources are arranged is called a Z axis.

In the third preferred embodiment, the LD module 200 is housed in the hole 102 of the heat sink 9a. The heat sink 9a includes a rod holding mechanism 103 that holds the LD light guide rod 12. The rod holding mechanism 103 is a hole where at least the LD light guide rod 12 can be housed and held. Providing the rod holding mechanism 103 eliminates the need for the rod holder 15 used in the first preferred embodiment.

Providing the hole 102 and the rod holding mechanism 103 of the heat sink 9a determines the respective positions of the LD holder 18, the LD 19, and the condensing lens 17 optically. This allows emitted laser light to enter the LD light guide rod 12 appropriately.

In the aforementioned structure, the optical system including the LD 19 and the condensing lens 17 is held more accurately. Further, the LD 19 contacts the heat sink 9a through the LD holder 18. This increases a contact area between the LD 19 and the LD holder 18 to enhance heat dissipation performance.

By housing the LD module 200 in the hole 102 of the heat sink 9a, the position of the optical system can be determined without requiring a fixing screw or the like.

Further, a rod holder for holding a rod is not required additionally. Thus, a component count can be reduced.

As described above, the aforementioned liquid crystal display device according to the third preferred embodiment using the LD 19 as a light source achieves a wide color reproduction range. Further, only a simple structure is required to dissipate heat to outside generated by a light-emitting element as the light source. This achieves a thin and highly-efficient heat sink responsive to an edge type at low cost.

<Effects>

Effects of the third preferred embodiment are illustrated below.

According to the third preferred embodiment, the heat sink 9a includes the rod holding mechanism 103 as a light guide member holder that holds the LD light guide rod 12 as a light guide member.

The rod holding mechanism 103 is a hole where the LD light guide rod 12 is inserted and held.

This structure with the rod holding mechanism 103 does not require a rod holder additionally. Thus, a component count can be reduced.

MODIFICATIONS

The material quality, material, size, or shape of each component, the positions of components relative to each other, or a condition for implementation described in each of the preferred embodiments is in all aspects illustrative and does not limit the present invention. Thus, numerous variations not shown can be assumed within the range of the present invention. As an example, these variations include modification, addition, or omission of an arbitrary component, and extraction of at least one component from at least one of the preferred embodiments and combination of this component with a component of a different preferred embodiment.

As long as no contradiction occurs, "one" component described in each of the preferred embodiments may include "one or more" components. Additionally, a component constituting the invention is a conceptual unit. One component may be formed of multiple structures and one component may correspond to a part of some structure. Each component of the present invention includes a structure of a different configuration or a different shape as long as the structure of the different configuration or the different shape achieves the same function.

The description given in this specification shall be referred for all the purposes of the present invention and should not be deemed as a background art.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display device comprising: a liquid crystal panel; a back plate having two side surfaces and a back surface; a reflection sheet; a light guide member, including at least one light guide rod, arranged between the reflection plate and a back surface of said liquid crystal panel; at least one laser diode module including a condensing lens, a laser diode holding member, and at least one laser diode, the at least one laser diode module arranged on at least one side surface of said light guide member; and a heat sink including a base arranged to extend at least partially along the back surface of said back plate and a projection extending along at least one of the side surfaces of the back plate wherein said heat sink includes a plurality of heat dissipating fins extending from the base in a direction parallel to the side surface of the back plate, said heat sink further includes a wire holder that extends from a side of the projection opposite the side of the projection extending along the side surface of said back plate that houses the at least one laser diode module such that the condensing lens of the laser diode module is inserted in a hole in said side surface of said heat sink projection, the hole aligning with the at least one light guide rod of said light guide member that receives light from said laser diode.

2. The liquid crystal display device according to claim 1, wherein said laser diode holding member further holds the condensing lens arranged between said light-emitting surface and said side surface of said light guide member.

3. The liquid crystal display device according to claim 1, wherein said laser diode holding member includes a first member that holds said laser diode and a second member that is a wiring substrate connected to said laser diode.

4. The liquid crystal display device according to claim 3, wherein said laser diode holding member further includes a wire holder that holds a wire for said laser diode extending from said second member.

5. The liquid crystal display device according to claim 3, further comprising a heat transferring member arranged between said first and second members.

6. The liquid crystal display device according to claim 1, wherein said heat sink further includes a light guide member holder that holds said light guide member, wherein said light guide member holder is a hole where said light guide member is inserted and held.

7. The liquid crystal display device according to claim 1, wherein said laser diode includes multiple laser diodes arranged along at least one side surface of said light guide member.

8. The liquid crystal display device according to claim 1, further comprising at least one light-emitting diode arranged on said back surface of said light guide member.

9. The liquid crystal display device according to claim 1, wherein the hole in the heat sink projection received light directly from said laser diode.

* * * * *